United States Patent
Yokum et al.

(10) Patent No.: US 11,889,314 B2
(45) Date of Patent: Jan. 30, 2024

(54) APPARATUS, SYSTEM AND METHOD FOR ASSOCIATING A DEVICE TO A USER OF A SERVICE

(71) Applicant: Leviton Manufacturing Co., Inc., Melville, NY (US)

(72) Inventors: Brian A. Yokum, New Orleans, LA (US); Aaron Ard, Ponchatoula, LA (US); Mark Buster, New Orleans, LA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 16/980,974

(22) PCT Filed: Apr. 12, 2018

(86) PCT No.: PCT/US2018/027304
§ 371 (c)(1),
(2) Date: Sep. 15, 2020

(87) PCT Pub. No.: WO2019/177636
PCT Pub. Date: Sep. 19, 2019

(65) Prior Publication Data
US 2020/0413248 A1    Dec. 31, 2020

Related U.S. Application Data

(60) Provisional application No. 62/644,134, filed on Mar. 16, 2018.

(51) Int. Cl.
*H04W 12/50* (2021.01)
*H04W 12/069* (2021.01)
(Continued)

(52) U.S. Cl.
CPC ......... *H04W 12/50* (2021.01); *H04L 63/0428* (2013.01); *H04W 12/041* (2021.01); *H04W 12/069* (2021.01)

(58) Field of Classification Search
CPC . H04W 12/50; H04W 12/069; H04W 12/041; H04W 12/043; H04L 63/0428; G06F 21/606; G06F 21/44
See application file for complete search history.

(56) References Cited

U.S. PATENT DOCUMENTS 9,002,750 B1 * 4/2015 Chu ................... H04W 12/04
                                                    705/72
9,894,199 B1 * 2/2018 Wiechman ........... H04W 12/06
(Continued)

OTHER PUBLICATIONS

International Search Report for the International Patent Application No. PCT/US2018/027304 dated Jul. 31, 2018.

*Primary Examiner* — Ashokkumar B Patel
*Assistant Examiner* — Forrest L Carey
(74) *Attorney, Agent, or Firm* — KDW Firm PLLC

(57) ABSTRACT

A system for associating a device to a user of a service hosted at a remote location may include a device, a WAN, and equipment. The user may identify a wireless network of the device and connect to the device using equipment. An application on the equipment may generate a key and send the key to the device. The device may then connect with the service and transmit the key to the service. The application may disconnect from the device and connect with the service. The application may send a request to the service to associate with the device, sending the key with the request. The service compares the keys received from the device and the application. If the respective keys match, then the service may associate the device to the user of the service. Otherwise, the association is denied.

13 Claims, 3 Drawing Sheets

(51) Int. Cl.
*H04W 12/041* (2021.01)
*H04L 9/40* (2022.01)

(56) References Cited

U.S. PATENT DOCUMENTS

| | | |
|---|---|---|
| 10,382,203 B1* | 8/2019 | Loladia ..................... H04L 9/14 |
| 2009/0006636 A1* | 1/2009 | Tanner .................. H04L 63/104 |
| | | 709/229 |
| 2014/0325606 A1 | 10/2014 | Raj et al. |
| 2016/0234213 A1 | 8/2016 | Kim et al. |
| 2016/0330182 A1 | 11/2016 | Jeon et al. |
| 2017/0012778 A1 | 1/2017 | Choyi et al. |
| 2017/0272316 A1* | 9/2017 | Johnson ................ H04L 61/301 |
| 2017/0359338 A1* | 12/2017 | Tschofenig ............. G06F 21/34 |
| 2018/0054305 A1 | 2/2018 | Djakovic |
| 2018/0097640 A1* | 4/2018 | Queralt ................... G06F 21/31 |
| 2018/0121921 A1* | 5/2018 | Woo ....................... H04W 12/06 |
| 2019/0021133 A1* | 1/2019 | Vandenheste ......... H04W 76/14 |
| 2020/0145372 A1* | 5/2020 | Yu ....................... H04L 67/1087 |
| 2020/0275249 A1* | 8/2020 | Kim ....................... H04W 12/06 |

\* cited by examiner

APPARATUS, SYSTEM AND METHOD FOR ASSOCIATING A DEVICE TO A USER OF A SERVICE

This application is a United States National Phase filing of International Application No. PCT/US2018/027304, filed Apr. 12, 2018, which is a non-provisional of, and claims the benefit of the filing date of, U.S. Provisional Application Ser. No. 62/644,134, filed Mar. 16, 2018, which applications are incorporated herein by reference in their entirety.

FIELD OF THE DISCLOSURE

The disclosure relates generally to associating a device to a user of a service, and more particularly, relates to securely associating a device to a user of a service hosted on a WAN.

DESCRIPTION OF THE RELATED ART

In the computer software field, codes (e.g. serial numbers, registration keys, random keys, etc.) have been used to authorize or associate a particular user with software. Similar methods have also been implemented in the Internet of Things ("IoT") field to associate a device to a user, requiring a user to provide a particular code, such as a serial number, to a service if the user wants to associate with the device. Further, the use of codes has been used in other applications, such as authorization of video streaming services on particular display devices or "set top boxes." In such applications, the device may generate a random key, which the user then provides to the service. The service then itself authorizes the particular device or relies on verification by another provider (such as the user's cable television provider).

However, these current methods have their disadvantages because they are often susceptible to someone else (i.e. an unauthorized user) being able to make the association before the intended or authorized user can do so. That is, a user of a service could associate with a device by simply providing the identifying code to the service. For example, a method that relies on a user knowing a particular unique, identifying code for a device, such as a serial number or registration key, is susceptible to having an unauthorized user finding out what the serial number is by looking at the device or obtaining this information in another unauthorized manner. Anyone who knows (or guesses) the identifying code could associate with the device before the intended user associates with the device.

To improve upon these methods, other methods require that the device be placed in an enrollment mode before a user could associate with the device. Although such a method may limit the risk of an unauthorized user associating with the device before the intended user can associate with the device, this method also has its drawbacks because an ongoing targeted attack on the device could still allow an unauthorized user to associate with the device before the intended user associates with the device. By introducing a randomly generated registration key that is communicated by a user, such as through a mobile app, to both the device and the service, it is better ensured that only the intended user can associate with the device.

SUMMARY OF THE DISCLOSURE

A method for associating a device to a user of a service hosted at a remote location is disclosed. The method including the steps of: establishing a direct network connection between the device and a user computing device, generating a key on the user computing device and sending the key to the device, establishing a network connection between the service and the device, wherein the device provides the key to the service, establishing a network connection between the user computing device and the service, wherein the user computing device sends a request to the service to associate with the device, and wherein the request includes the key and, comparing, by the service, the key provided by the device and the key provided by the user computing device, wherein an association between the device and the user is made if the respective keys are the same.

A method for associating a device to a user of a service hosted at a remote location is disclosed. The method for the device including the steps of: connecting to a user computing device via a direct network connection, receiving a message from the user computing device, wherein the message includes a generated key, establishing a network connection to the service, and, providing the key to the service, wherein the device is associated with the user if the key provided by the device to the service matches the key that the service receives from the user computing device.

A system for associating a device to a user of a service hosted at a remote location is disclosed. The device including: a first communication link to start a peer-to-peer network, a second communication link to make a direct network connection to a user computing device, wherein the user computing device joins the peer-to-peer network, a message received from the user computing device via the second communication link, wherein the message includes a generated key and, a third communication link to connect to the service, wherein the device provides the key to the service via the third communication link, wherein the device is associated with the user if the key provided by the device to the service matches a key that the service receives from the user computing device.

A method for associating a device to a user of a service hosted at a remote location using a user computing device is disclosed. The method for the user computing device including the steps of: joining a direct network connection of the device via a first communication link, generating a key and creating a message, wherein the message includes the key, sending the message to the device, connecting to the service via a second communication link and, sending a request to the service for the user to associate with the device, wherein the request includes the key, wherein the user is associated with the device if the key that the user computing device sends to the service is the same as a key that the service receives from the device.

A system for associating a device to a user of a service hosted at a remote location using a user computing device is disclosed. The user computing device including: a first communication link to make a direct network connection to a device, a message transmitted to the device via the first communication link, wherein the message includes a generated key and, a second communication link to connect to the service, wherein the user computing device sends a request to the service via the second communication link to associate the user with the device, and wherein the user computing device provides the key to the service via the second communication link, wherein the user is associated with the device if the key provided by the user computing device to the service is the same as a key that the service receives from the device.

A method for associating a device to a user of a service hosted at a remote location is disclosed. The method for the service including the steps of: connecting to the device via a first communication link, receiving a first key from the device, connecting to a user computing device via a second communication link, receiving, from the user computing device, a request for the user to associate with the device, wherein the request includes a second key and, comparing the first key received from the device and the second key received from the user computing device, wherein the service makes an association between the device and the user if the first and second keys are the same.

A system for associating a device to a user of a service hosted at a remote location is disclosed. The service including: a first communication link to connect to the device, wherein the first communication link transmits a first key from the device to the service and, a second communication link to connect to a user computing device, wherein the service receives a request from the user computing device via the second communication link for the user to associate with the device, and wherein the request includes a second key, wherein the service compares the first key to the second key, and wherein the service makes an association between the device and the user if the first and second keys are the same.

BRIEF DESCRIPTION OF THE DRAWINGS

One or more aspects of the disclosed subject matter are particularly pointed out and distinctly claimed as examples in the claims at the conclusion of the specification. The foregoing and other objects, features, and advantages of the disclosed subject matter may be more readily understood by one of ordinary skill in the art with reference being had to the following detailed description of several embodiments thereof, taken in conjunction with the accompanying drawings wherein like elements are designated by identical reference numerals throughout the several views, and in which:

DETAILED DESCRIPTION

Figure 1:
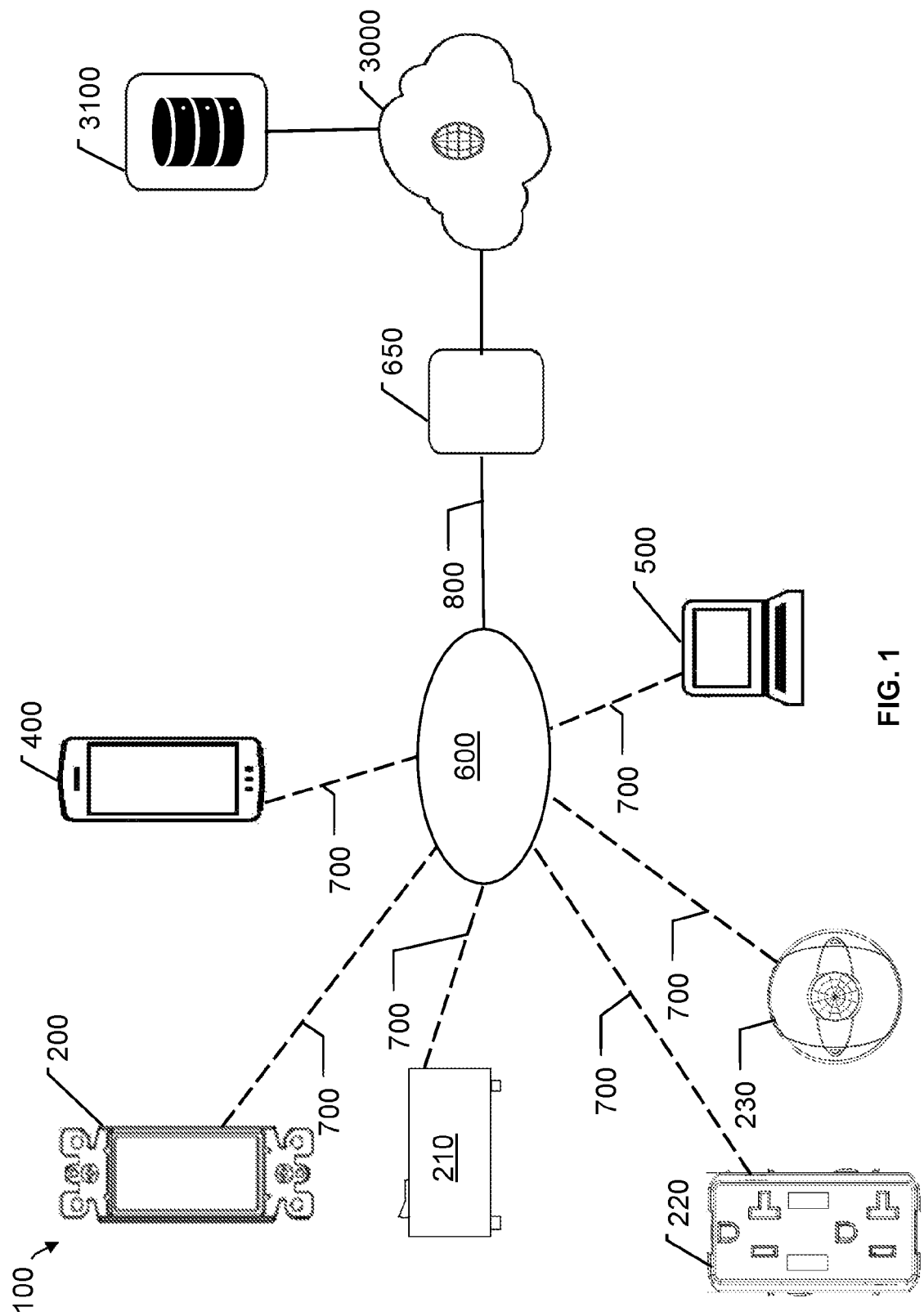
FIG. 1 illustrates a system for associating a device to a user of a service in accordance with an exemplary embodiment.

The present disclosure describes an apparatus, system and method for associating a device to a user of a service. Embodiments will be described below while referencing the accompanying figures. The accompanying figures are merely examples and are not intended to limit the scope of the present disclosure.

This disclosure provides an apparatus, system and method to better safeguard a device being associated only with a particular/authorized user of a service. It is sometimes desirable that control of a device is restricted to a particular user or group of users and, once the device has been associated with this user or group of users, no other user should be allowed access to the device. In one particular embodiment of the disclosure, the device may be a load control device and the service may be an Internet-based service (e.g., a WAN/cloud-based service) that allows a user to control the device from an application (e.g., mobile application, computer application, web-based application, etc.) running on any suitable computerized device/equipment such as, but not limited to, a smart phone, tablet, computer, laptop, personal digital assistant, web server, or the like. Other examples of such a device may include, but are not limited to, wiring devices, switches, dimmers, fan speed controls, receptacles, ground fault circuit interrupters, arc fault circuit interrupters, ground fault protection equipment, home automation devices, smart home devices, IoT devices, audio/video devices, security devices, occupancy sensors, surge protective devices, Universal Serial Bus (USB) receptacles, circuit breakers, circuit breaker controllers/aggregators, or any suitable combination thereof.

In one embodiment, the disclosure makes use of a key (e.g., registration key) that is provided by a user via an application running on any suitable computerized user device (e.g., mobile device, tablet, laptop computer, desktop computer), to both the device to which the user wishes to associate, and to the service through which the user will associate with the device. The key is provided to the device by a user computing device preferably through a local peer-to-peer (P2P) network connection requiring the user/user computing device to be in close physical proximity to the device, such as, e.g., a direct WiFi connection. After receiving the key, the device then connects to the service and provides the key to the service, e.g. by connecting to a local area network (LAN) which connects via a gateway to a wide area network (WAN) on which the service resides. The user then connects to the service via an application running on any suitable computerized user device and requests to associate with the device, providing the key as part of the request. The service compares the respective keys provided by the user computing device and the device, and if the keys match, an association is made between the device and the user. Otherwise, the association is denied. The service preferably provides an acknowledgement to one or both of the device to be associated and the user computing device as to the success or failure of the association although it should be understood that no acknowledgement may be provided, only an acknowledgment of success, only an acknowledgment of failure or any combination thereof. In the event that no acknowledgment is provided to either or both the device to be associated and the user computing device, then a simple time-out procedure could be implemented.

FIG. 1 shows one exemplary embodiment of a system 100 in accordance with this disclosure. The system 100 may include a device to be associated (e.g., wiring device 200, 210, 220, 230), a wide area network 3000 (e.g., Internet), a user computing device such as a mobile device 400 (e.g., smart phone, tablet, or the like with cellular network connectivity, e.g., 3G, 4G, 5G, LTE, etc.) and/or a computer 500 (e.g., desktop, laptop, netbook, etc.), and a LAN 600 (e.g., wired Ethernet or wireless LAN (WLAN) such as 802.11 WiFi). Reference to embodiments herein, and any corresponding disclosure, which describe device 200 or mobile computing device 400 should be understood to also apply to use of other devices, e.g., devices 210, 220 and 230, and the like as well as other user computing devices, e.g., computer 500.

Device 200, mobile device 400, and computer 500 connect to the LAN 600, e.g., via wireless communication links 700. In FIG. 1, the LAN 600, device 200, mobile device 400, computer 500 and wireless communication links 700 are illustrated in a hub-and-spoke arrangement. This is done simply for the sake of clarity and is meant to be inclusive of any suitable network topology including a ring network, mesh network, and daisy chain network. As such, any device on the LAN 600 may communicate directly with any other device on the LAN 600. The device 200 may include a device-based service, e.g., wireless access point, used to create its own P2P network, e.g., wireless direct such as WiFi direct. The WAN 3000 may include a service 3100, e.g., cloud-based service, that is hosted on the WAN 3000.

Between the LAN 600 and the WAN 3000, there may be a gateway 650, which allows devices on the LAN to communicate with the WAN and devices or services on the WAN. The LAN 600 is connected to the gateway 650 via communication link 800. In an alternative embodiment, the LAN 600 and the gateway 650 may be included within the same housing (e.g. a wireless router).

The mobile device 400 and/or the computer 500 may communicate with the device 200 directly via a P2P connection (not shown). In addition, the mobile device 400, the computer 500 and the device 200 may connect to the LAN 600 via wireless communication links 700, with the LAN 600 connecting to the WAN 3000 via gateway 650. However, it will be understood by one of ordinary skill in the art that in alternative embodiments, the mobile device 400, the computer 500, and the device 200 may connect directly to the WAN 3000 (without going through the LAN 600 or gateway 650). In addition, other embodiments may include wired communication links in addition to, or in place of, wireless communication links 700. Further, in alternative embodiments, the device 200 and/or the computerized devices (e.g., mobile device 400, computer 500, etc.) may use other communication methods other than the LAN. Such alternative communication methods may include but not limited to a cellular network, Long-Term Evolution (LTE) network, 5th generation wireless systems (5G), personal area network (PAN, e.g. Bluetooth) and the like. Although a WAN-based service is described, it will be understood by one of ordinary skill in the art that other embodiments may include a service that is hosted at a remote location and/or outside of a LAN but does not necessarily reside on the WAN.

In one embodiment, the user may place the device 200 into an enrollment mode. The enrollment mode may be initiated by, for example, the user physically manipulating the device 200. However, one of ordinary skill in the art will recognize that other ways to initiate the enrollment mode are possible, and fall within the inventive principles described therein. In addition, one of ordinary skill in the art will recognize that in alternative embodiments, the enrollment mode is optional; e.g., the device 200 could remain in, or power on/start up awaiting a P2P connection without being placed into an enrollment mode.

The device 200 may use its wireless access point to create a wireless direct or peer-to-peer network, and the device 200 may start up a device-based service on the wireless direct or peer-to-peer network connection. The device-based service may be, for example, a web server or any other service configured to process a message (described in more detail below) from the user.

After the device 200 is placed into the enrollment mode, the user may identify the wireless network of the device. For example, the device 200 may advertise a network identification. Such network identification may include, for example, a brief description of the device 200 and a portion of a unique serial number of the device (i.e. "Dimmer 1234"). It will be understood by one of ordinary skill in the art that other network identifications may be envisioned and used. This advertisement of the network identification by the device 200 facilitates the user in finding the applicable wireless direct or peer-to-peer network of the device 200 in a list of wireless networks when the device is placed in enrollment mode. By identifying the wireless network of the device in this manner, the user is not required to input any information about the device into the application. In addition, there is no need for the user to refer to any identifying information that could potentially be lost or stolen, such as but not limited to a card with a preprinted registration key or information included on the packaging of the device. Further, the user does not need to physically inspect the device to view information, such as removing a cover plate on an in-wall dimmer to view information that is printed on the dimmer.

The user may then use the mobile device 400 to connect to the wireless direct or peer-to-peer network of the device 200 via the P2P communication link (not shown). The application running on the mobile device 400 may generate a key (i.e. registration key) and a message (not shown), the message including the key. The key may be randomly generated. In some exemplary embodiments, the key may be an alphanumeric string (i.e. containing lower case "a"-"z", upper case "A" to "Z", and/or numerical characters "0" to "9"). Alternative embodiments may employ other characters, such as special characters, i.e. "$", "^", "!", non-Latin characters, etc. In alternative embodiments, the message may also include information that the device may need to connect to the LAN and/or the service on the WAN.

The application may send the message to the device 200 via the P2P communication link. When the message is sent to the device 200, the message may be optionally encrypted or not encrypted. If the message is encrypted, the application on the mobile device 400 may send a request to the device 200 via the P2P communication link for the security certificate of the device 200. The security certificate may include the public encryption key of the device 200. Regardless of whether encryption was chosen, the application running on the mobile device 400 may send the message to the device 200 via the P2P communication link. If the message was optionally encrypted, the device 200 may then decrypt the message using its private encryption key.

If the encrypted network connection is employed, it may be done so via public/private key encryption using the security certificate of the device 200. This enables the enrollment message to be encrypted with minimal overhead. For example, the device 200 does not need to be running a secure device-based service or web server (i.e. employing the https protocol) to allow for the encrypted message. Only a single message (i.e. the enrollment message) needs to be encrypted. The entire device-based service or web server session does not need to be encrypted. IoT devices, with limited resources, particularly benefit from such low overhead. It will be understood by one of ordinary skill in the art that in alternative embodiments the device may only include a public encryption key and not a security certificate.

After receiving the message, the device 200 may shut down its device-based P2P service, e.g., access point. The device 200 may then establish a network connection with the service 3100 on the WAN 3000 via the wireless communication link 700, in which the device 200 may transmit the key to the service 3100. In some embodiments, the device 200 may be connected to the WAN 3000 through a LAN 600. The application running on the mobile device 400 may disconnect its P2P communication link 700 from the device 200 and establish a network connection with the service 3100 on the WAN 3000 via wireless communication link 700. In some embodiments, this network connection between the application on the mobile device 400 and the service 3100 on the WAN 3000 may be through the LAN 600. The application on the mobile device 400 may send the service 3100, via the wireless communication link 700, a request to associate with the device 200. This request may include the key. The service 3100 may then compare the key that the application on the mobile device 400 provided to the service 3100 and the key that the device 200 provided to the service 3100. If the key provided by the application matches the key provided by the device 200, then the service 3100 may associate the device 200 to the user of the service 3100. If the key provided by the application does not match the key provided by the device 200, then the service 3100 denies an association of the device 200 to the user of the service 3100.

The system 100 better ensures that the intended user can associate with the device, and not an unauthorized user. This is accomplished by using a key that is randomly generated by a third party (e.g., application running on a mobile device 400 and/or a computer 500) rather than use of, for example, a serial number (that may be more easily obtained by an unauthorized user). In addition, the user needs to be able to physically access or be in close physical proximity to the device, helping to mitigate the risk of unwanted users enrolling the device. A further beneficial feature is that the key is generated by a means other than the device 200 or the service 3100 on the WAN 3000. This results in enhanced security and convenience.

As already indicated, in addition to, or in place of device 200, one or more of any other suitable devices may be associated with the service 3100. Non-limiting examples of such devices (not all are shown in FIG. 1) that can be associated with the service 3100 may include a circuit breaker 210, a receptacle 220 (e.g., a protective device such as a GFCI, GFPE, AFCI, GFCI/AFCI or a USB receptacle), a fan speed control and/or dimmer, and an occupancy sensor 230. Such other suitable devices may communicate with the mobile device 400, computer 500, and/or the LAN 600 via wireless communication links 700.

Figure 2:
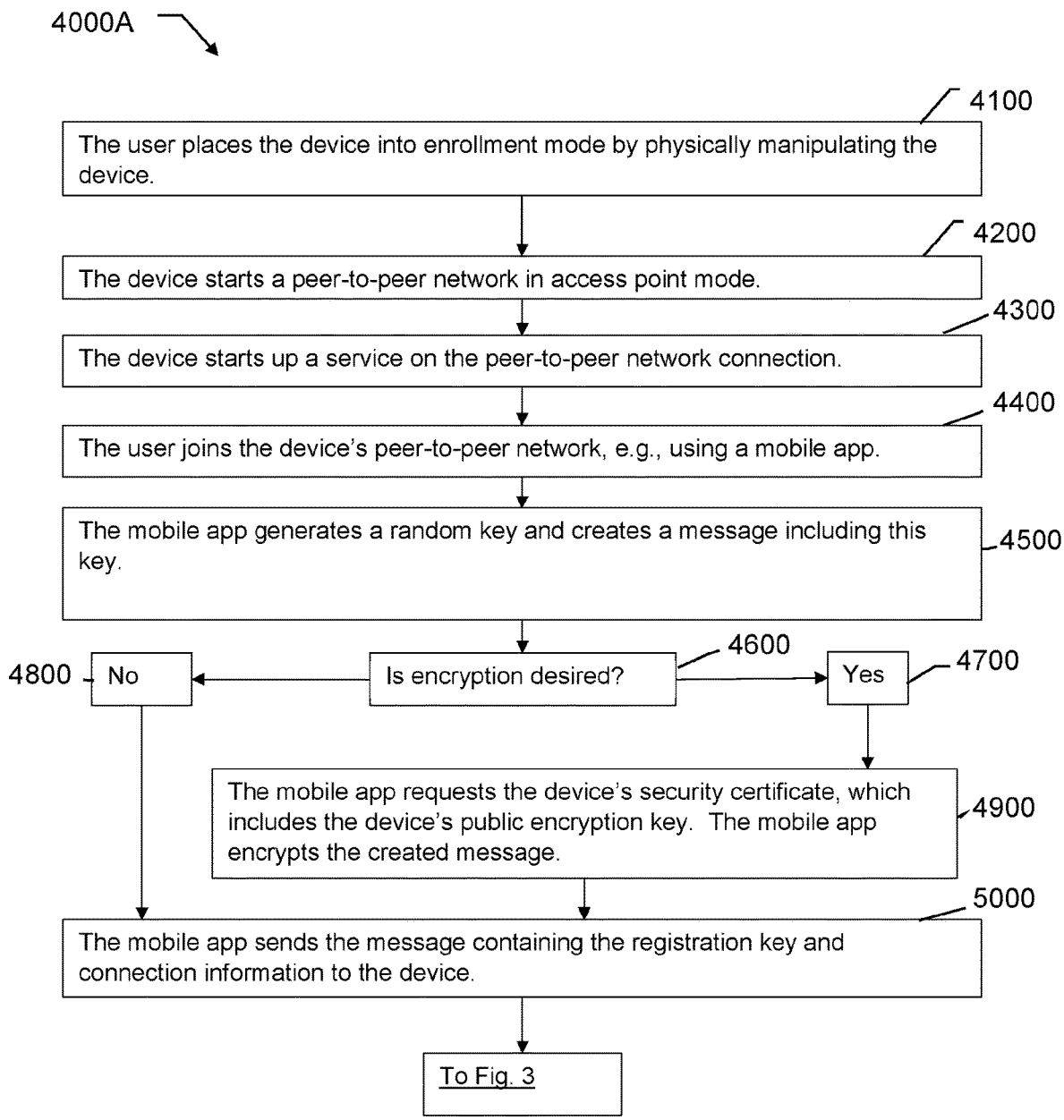
FIGS. 2-3 illustrate a method for associating a device to a user of a service in accordance with an exemplary embodiment.
Figure 3:
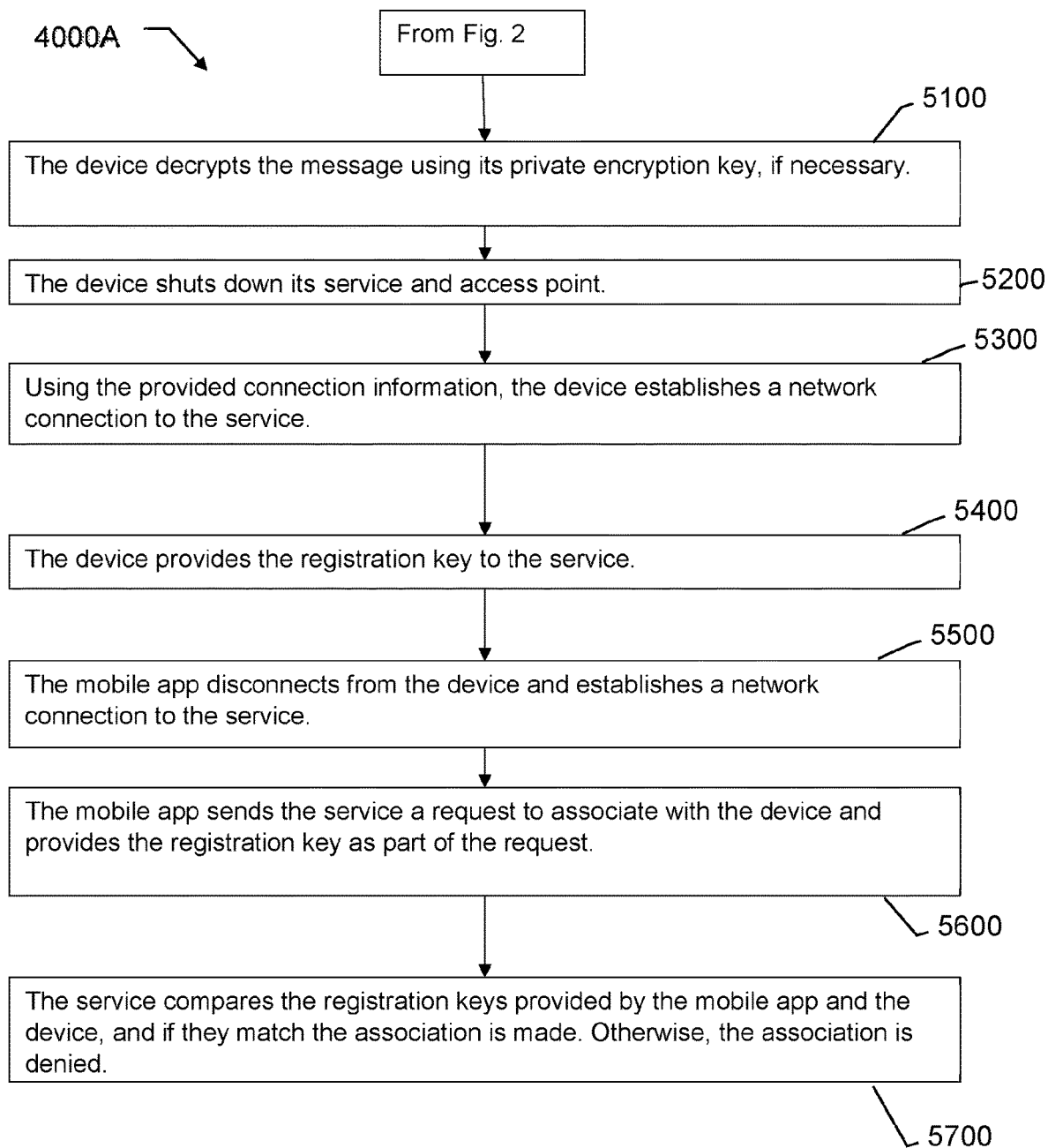

Referring to FIGS. 2-3, a method or process 4000A-B of associating a device to a user of a service is described. At step 4100, the device is placed into an enrollment mode. In this exemplary embodiment, the enrollment mode may be initiated by a user physically manipulating the device. However, a person of ordinary skill in the art will recognize that other ways to initiate the enrollment mode are possible and fall within the inventive principles described therein. In addition, one of ordinary skill in the art will recognize that in alternative embodiments, the enrollment mode is optional. At step 4200, the device starts a network connection in access point mode. One example of the network may be a IEEE 802.11 wireless direct network. At step 4300, the device starts up a device-based service (e.g., web server) on the network connection. At step 4400, the user then joins the network of the device. The user may join the network of the device in various ways, such as but not limited to a mobile application using a mobile device, an application using a computer, etc. For purposes of this exemplary embodiment, a mobile application is used. At step 4500, the mobile application generates a key and creates a message, in which the message includes the key. The key may be randomly generated. In alternative embodiments, the message may include other information that the device may need to connect to the service.

At steps 4600, 4800, if encryption is not desired, then at step S000, the mobile application sends the message to the device. In some embodiments, optional steps of encryption may be included. For example, at step 4600-4700, if encryption is desired, then at step 4900, the mobile application requests the security certificate of the device, which includes the public encryption key of the device. The mobile application then encrypts the message that it created. After the optional step 4900 of encryption, at step S000, the mobile application sends the message to the device. At step S100, the device then decrypts the message using a private encryption key of the device. It will be understood by one of ordinary skill in the art that in alternative embodiments, the device may only include a public encryption key and not a security certificate. That is, at step 4900, the mobile application requests a public encryption key of the device and not a security certificate of the device.

Regardless of whether encryption is employed (steps 4700, 4900, 5100) or encryption is not employed (step 4800), at step S200, the device then shuts down the device-based service (e.g., web server) and P2P connection (e.g., wireless direct network) on the device. At step S300, the device establishes a network connection to the service. In some embodiments, the service may be an Internet, cloud-based service. However, in other embodiments, the service is hosted at a remote location and/or outside of a LAN but does not necessarily reside on the WAN.

At step S400, the device provides the key to the service and, at step S500, the mobile application disconnects from the device and establishes a network connection to the service. At 5600, the mobile application sends the service a request to associate with the device, including the key as part of the request. At step S700, the service then compares the key that the service received from the mobile application and the key that the service received from the device. If the respective keys match, the service makes an association between the user and the device. If the respective keys do not match, the service denies the association between the user and the device.

This disclosure has utility in fields where a device needs to be securely accessed from a remote location, particularly with respect to IoT applications.

While an apparatus, system and method for associating a device to a user of a service have been described with reference to certain embodiments, it will be understood by those skilled in the art that various changes may be made, and equivalents may be substituted without departing from the spirit and scope of the claims of the application. Other modifications may be made to adapt a particular situation or material to the teachings disclosed above without departing from the scope of the claims. Therefore, the claims should not be construed as being limited to any one of the particular embodiments disclosed, but to any embodiments that fall within the scope of the claims.

What is claimed is:

1. A method for associating a device to a user of a service hosted at a remote location, the method comprising:
    establishing a direct network connection between the device and a user computing device;
    requesting a security certificate from the device via the direct network connection;
    receiving the security certificate from the device, wherein the security certificate comprises a public encryption key;
    generating a device key on the user computing device by an application running on the user computing device;
    creating a message, by the user computing device, wherein the message comprises the device key and connection information, wherein the connection information comprises information to connect to a local network and information for the device to connect to the service;
    encrypting, by the user computing device, the message with the public encryption key to create an encrypted message;
    sending the encrypted message to the device wherein the device provides the device key to the service;
    connecting with the local network after disconnecting the direct network connection;

connecting, by the application, with the service on a remote network via a gateway connected to the local network;

sending a request to the service to associate with the device, and wherein the request includes the device key to establish a network connection between the user computing device and the service, wherein the service is associated with the device in response to the request if the device key provided by the user computing device matches the device key provided by the device$^e$. and performing a time-out procedure if an acknowledgement is not received from the service.

2. The method of claim 1 further comprising placing the device into an enrollment mode.

3. The method of claim 1, wherein generating the device key on the user computing device comprises randomly generating an alphanumeric string, wherein the device key comprises the alphanumeric string.

4. The method of claim 3 further comprising:
requesting, from the device, the public encryption key;
wherein the device decrypts the message using a private encryption key.

5. The method of claim 1, wherein the service is an Internet-based service.

6. A method for associating a device to a user of a service hosted at a remote location, the method for the device comprising:
connecting to a user computing device via a direct network connection;
receiving a request for a security certificate from the user computing device;
sending a security certificate to the user computing device, the security certificate comprising a public encryption key;
receiving an encrypted message from the user computing device, wherein the message includes a device key generated on the user computing device by an application running on the user computing device and connection information, wherein the connection information comprises information to connect to a local network and information required for the device to connect to the service;
decrypting the encrypted message with a private encryption key to determine the device key and the connection information;
shutting down a wireless network and a device-based service after receipt of the encrypted message;
establishing a connection with the local network based on the information to connect to the local network;
establishing a network connection to the service via the local network;
providing the device key to the service;
wherein the device is associated with the user computing device in response to a determination by the service that the device key provided by the device to the service via the network connection matches a user computing device key that the service receives from the user computing device; and
performing a time-out procedure if an acknowledgement is not received from the service.

7. The method of claim 6 further comprising opening the device-based service, wherein the device-based service is a web server that is configured to process the message from the user.

8. A device associated to a user of a service hosted at a remote location, the device comprising:

a wiring device; and
a wireless access point, wherein the wireless access point comprises a device-based service to:
start a peer-to-peer network;
advertise the peer-to-peer network;
establish a first communication link to make a direct network connection to a user computing device;
receive a request for a security certificate from the user computing device;
send a security certificate to the user computing device, the security certificate comprising a public encryption key;
receive an encrypted message from the user computing device, wherein the encrypted message includes a user computing device key generated on the user computing device by an application running on the user computing device and connection information, wherein the connection information comprises information to connect to a local network and information required for the device to connect to the service;
decrypt the encrypted message with a private encryption key to determine the user computing device key and the information required for the device to connect to the service;
shut down the peer-to-peer network after receipt of the encrypted message;
establish a connection with the local network based on the information to connect to the local network;
establish a second communication link to connect to the service, wherein the device provides a device key generated on the user computing device to the service via the second communication link;
wherein the device is associated with the user computing device in response to a determination by the service that the device key provided by the device to the service via the second communication link matches the user computing device key that the service receives from the user computing device; and
performing a time-out procedure if an acknowledgement is not received from the service.

9. The device of claim 8, wherein the message further includes information required for the device to connect to the service and wherein the device is one of a load control device, a switch, a dimmer, a fan, a receptacle, a ground fault circuit interrupter, an arc fault circuit interrupter, ground fault protection equipment, a home automation device, a smart home device, an "Internet of Things" device, an audio/video device, a security device, an occupancy sensor, a surge protective device, a Universal Serial Bus device, a circuit breaker, a circuit breaker controller, and a circuit breaker aggregator.

10. The device of claim 8, wherein the device is placed into an enrollment mode, and
wherein the device advertises an identification of the peer-to-peer network so the user computing device can join the peer-to-peer network of the device.

11. The device of claim 8, wherein the device further comprises a web server that is configured to start up on the peer-to-peer network and to process the message from the user computing device.

12. The device of claim 11, wherein a device-based service shuts down when the peer-to-peer network is disconnected.

13. The device of claim 8 further comprising a public encryption key of the device, wherein the device sends the public encryption key to the user computing device to receive the encrypted message.

\* \* \* \* \*

UNITED STATES PATENT AND TRADEMARK OFFICE
CERTIFICATE OF CORRECTION

| | |
|---|---|
| PATENT NO. | : 11,889,314 B2 |
| APPLICATION NO. | : 16/980974 |
| DATED | : January 30, 2024 |
| INVENTOR(S) | : Brian A. Yokum, Aaron Ard and Mark Buster |

It is certified that error appears in the above-identified patent and that said Letters Patent is hereby corrected as shown below:

In the Claims

Column 9, in Claim 1, Lines 10-11, please delete "devic$^e$. and" and replace with --device; and--.

Signed and Sealed this
Sixteenth Day of April, 2024

Katherine Kelly Vidal
*Director of the United States Patent and Trademark Office*